US008888172B2

(12) United States Patent
Gur et al.

(10) Patent No.: US 8,888,172 B2
(45) Date of Patent: Nov. 18, 2014

(54) VEHICLE GLAZING ASSEMBLY WITH NOISE AND VIBRATION REDUCTION TECHNIQUES

(75) Inventors: Yuksel Gur, Ann Arbor, MI (US); David Anthony Wagner, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/565,769

(22) Filed: Aug. 2, 2012

(65) Prior Publication Data

US 2014/0035324 A1   Feb. 6, 2014

(51) Int. Cl.
*B60J 1/00* (2006.01)

(52) U.S. Cl.
USPC ............ 296/200; 296/215; 296/210; 296/191

(58) Field of Classification Search
CPC ............................ B29C 45/1635; H02G 3/045
USPC ............... 296/211, 216.01, 210, 84.1, 146.1, 296/78.1, 29, 146.15, 191, 216.05, 218, 296/96.14, 200; 428/394, 34; 52/208
See application file for complete search history.

(56) References Cited

U.S. PATENT DOCUMENTS

| | | | | |
|---|---|---|---|---|
| 1,703,355 A | * | 2/1929 | Nielsen | 296/96.14 |
| 1,777,435 A | * | 10/1930 | Hogelund | 52/203 |
| 1,927,033 A | * | 9/1933 | Herron | 296/96.14 |
| 2,102,454 A | * | 12/1937 | Bennett | 296/96.14 |
| 2,189,465 A | * | 2/1940 | Haley et al. | 52/171.2 |
| 2,437,664 A | * | 3/1948 | Hicks | 296/96.12 |
| 2,615,163 A | * | 10/1952 | Ring | 2/431 |
| 4,011,356 A | * | 3/1977 | Lambert et al. | 428/34 |
| 4,019,295 A | * | 4/1977 | Derner et al. | 52/171.3 |
| 4,525,961 A | * | 7/1985 | Hansen | 52/208 |
| 4,613,073 A | * | 9/1986 | Christ et al. | 237/12.3 R |
| 4,614,676 A | * | 9/1986 | Rehfeld | 428/34 |
| 4,822,098 A | * | 4/1989 | Vogt et al. | 296/146.5 |
| 5,009,463 A | | 4/1991 | Saitoh et al. | |
| 5,120,584 A | * | 6/1992 | Ohlenforst et al. | 428/34 |
| 5,154,953 A | * | 10/1992 | de Moncuit et al. | 428/34 |
| 5,264,270 A | * | 11/1993 | Agrawal | 428/192 |
| 5,505,023 A | * | 4/1996 | Gillen et al. | 49/380 |
| 5,545,277 A | | 8/1996 | Hashemi et al. | |

(Continued)

FOREIGN PATENT DOCUMENTS

| | | | | |
|---|---|---|---|---|
| EP | 327793 A2 | * | 8/1989 | B32B 17/10 |
| EP | 908866 | | 7/2005 | |

(Continued)

OTHER PUBLICATIONS

Using Plastics in Auto "Glass" Can Lightweight a Vehicle and Help Prevent Passenger Injuries, American Chemistry Council, http://www.google.com/url?sa=t&rct=j&q=&esrc=s&source=web&cd=1&ved=0CGoQFjAA&url=http%3A%2F%2Fwww.plastics-car.com%2Fautoglass&ei=pFSzT_reOcvjrAeR_LXLBg&usg=AFQjCNF7FyN2LzCCqL0CV2iv7VVyFbTuvg&sig2=VSJYjMuPDgx1Ug364KEcpg.

(Continued)

*Primary Examiner* — Pinel Romain
(74) *Attorney, Agent, or Firm* — Brooks Kushman P.C.; Jason Rogers

(57) ABSTRACT

The present disclosure relates to a vehicle glazing assembly with noise and vibration reduction techniques, having: a panel; and a first layer of first stiffening material applied at a perimeter of the panel.

12 Claims, 7 Drawing Sheets

(56) References Cited

U.S. PATENT DOCUMENTS

| | | | |
|---|---|---|---|
| 6,186,578 B1 * | 2/2001 | Garnier et al. | 296/146.1 |
| 6,220,656 B1 * | 4/2001 | Martin, Jr. | 296/215 |
| 6,299,236 B1 * | 10/2001 | Praud et al. | 296/146.7 |
| 6,361,867 B2 * | 3/2002 | Kishida et al. | 428/428 |
| 6,394,242 B1 * | 5/2002 | Allaei | 188/378 |
| 6,432,522 B1 | 8/2002 | Friedman et al. | |
| 6,686,002 B2 * | 2/2004 | Auerbach | 428/34 |
| 6,764,129 B2 * | 7/2004 | Kose | 296/146.15 |
| 6,946,194 B2 * | 9/2005 | Gearhart et al. | 428/354 |
| 7,073,293 B2 * | 7/2006 | Galer | 49/413 |
| 7,147,923 B2 * | 12/2006 | Roberts et al. | 428/423.3 |
| 7,472,943 B2 * | 1/2009 | Oberhaus | 296/146.16 |
| 7,828,373 B2 * | 11/2010 | Fernholz et al. | 296/191 |
| 8,240,087 B2 * | 8/2012 | Kinross | 49/380 |
| 2005/0055884 A1 * | 3/2005 | Kinross | 49/413 |
| 2006/0032181 A1 | 2/2006 | Recker | |
| 2008/0176043 A1 | 7/2008 | Masaki et al. | |

FOREIGN PATENT DOCUMENTS

| | | | | |
|---|---|---|---|---|
| JP | 06227250 A | * | 8/1994 | B60J 1/00 |
| JP | 2000142119 | | 5/2000 | |
| JP | 2010195399 A | * | 9/2010 | |

OTHER PUBLICATIONS

Jun Lu, Acoustic Windshield Significantly Reduces Structure-Bourne and Airbourne Noises for Deisel Vehicles and Brings Ecological Benifit, Society of Automotive Engineers, 09NVC-0331, 2008, http://www.google.co.in/url?sa=t&rct=j&q=&esrc=s&source=web&cd=1&ved=0CF4QFjAA&url=http%3A%2F%2Fwww.saflex.com%2Fpdf%2FSaflex%25C2%25AE%2520Technical%2520-Paper%2520-%2520Acoustic%2520Windshields%2520-and%2520Environmental%2520Benefit.

Gur et al., Lightweight Glazing Materials and their NVH Performance in Vehicle Design, Ford Research and Advanced Engineering Technical Reports, SRR-2011-0097, Aug. 5, 2011.

Using Plastics in Auto •Glass• Can Lightweight a Vehicle and Help Prevent Passenger Injuries, American Chemistry Council, http://www.google.com/url? January 7, 2012sa=t&rct=j&q=&esrc=s&source=web&cd=1&ved=0CGoQFjAA&url=http%3A%2F%2Fwww.plastics-car.com%2Fautoglass&ei=pFSzT__reOcvjrAeR__LXLBg&usg=AFQjCNF7FyN2LzCCqL0CV2iv7VVyFbTuvg&sig2=VSJYjMuPDgx1Ug364KEcpg.

\* cited by examiner

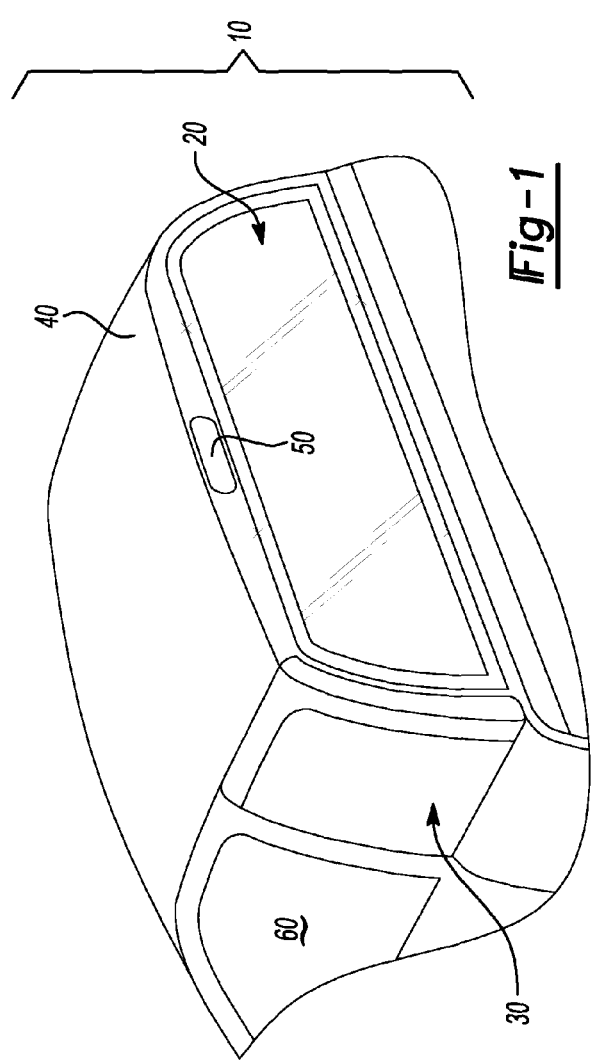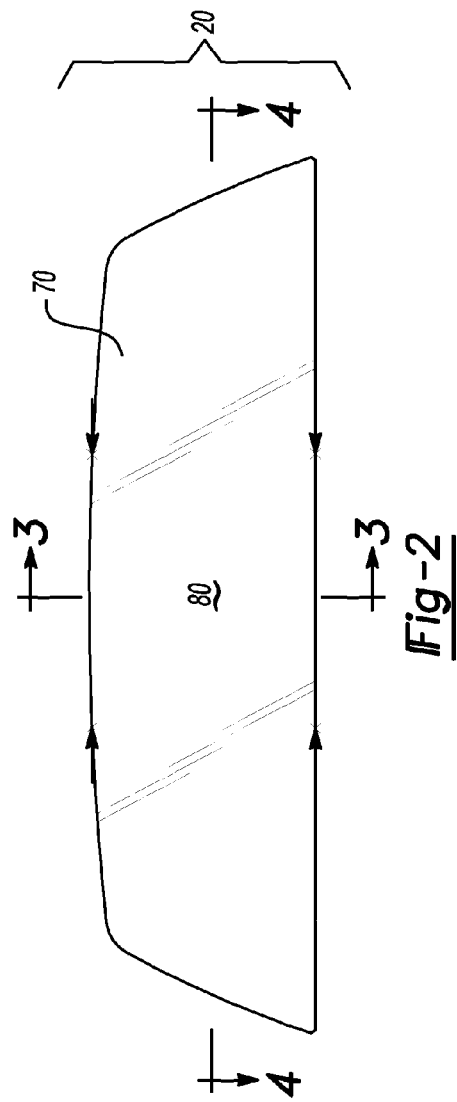

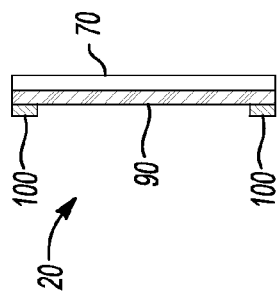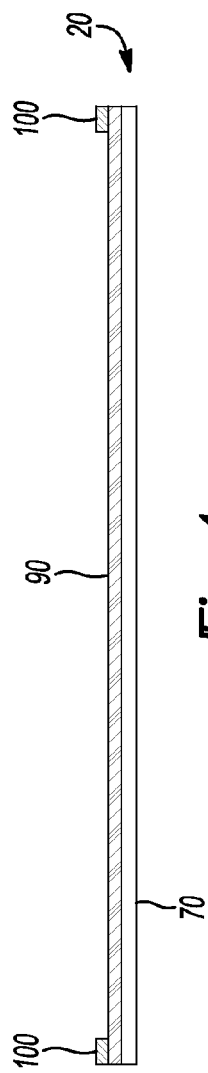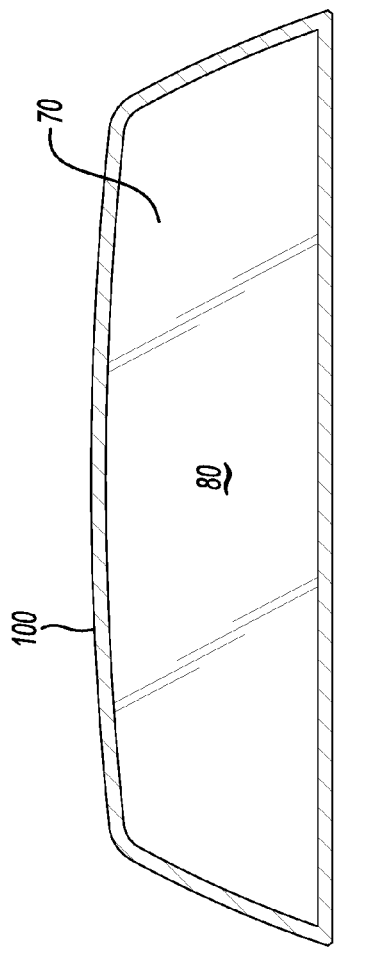

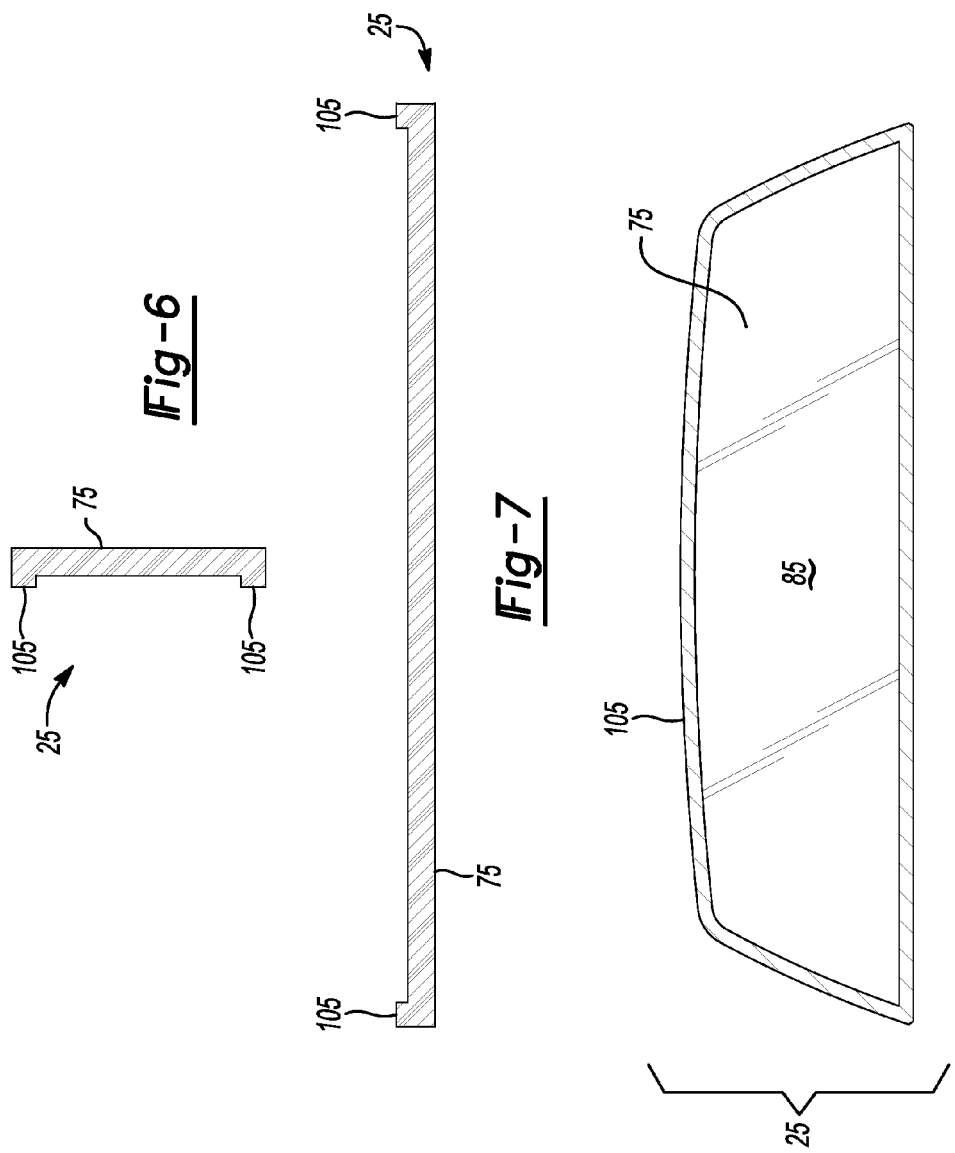

VEHICLE GLAZING ASSEMBLY WITH NOISE AND VIBRATION REDUCTION TECHNIQUES

TECHNICAL FIELD

The present disclosure relates to vehicle glazing assemblies with noise and vibration reduction techniques, such as for example, a vehicle backlite assembly.

BACKGROUND

Conventional vehicles include a number of different transparent or semi-transparent surfaces that are called glazings or glazing assemblies. These include for example, the backlight, windshields and sidelights. Traditionally, vehicle glazing assemblies included a tempered glass panel through which light or objects can be seen from one side through to the other. Glass, however, weighs substantially more than other materials that also have transparent qualities. Specifically polymers can be used for the panels for these glazing assemblies.

The use of polymers as the primary surface for a glazing assembly, however, has drawbacks. For one, many polymers are less rigid than glass. Also, the noise and vibration characteristics of polymers can be less appealing than glass. So prior to the present teachings vehicle engineers experienced a catch-22 with respect to the design and manufacture of glazing materials—having to choose between tempered glass (a heavier material) and (polymers a less rigid and potentially noisier material).

Therefore, it is desirable to have a vehicle glazing assembly with noise and vibration reduction techniques that has a light weight panel with cost-effective reinforcing techniques.

SUMMARY

The present disclosure addresses one or more of the above-mentioned issues. Other features and/or advantages will become apparent from the description which follows.

One exemplary embodiment of the present disclosure relates to a vehicle glazing assembly with noise and vibration reduction techniques, having: a panel; and a first layer of first stiffening material applied at a perimeter of the panel.

Another exemplary embodiment of the present disclosure relates to a vehicle, having: a body frame; and a glazing assembly, including: a panel composed of a first stiffening material, attachable to the body frame at an attachment point; and a layer of a second stiffening materials applied to the panel at the attachment point.

Another exemplary embodiment of the present disclosure relates to a method of manufacturing a vehicle glazing assembly with noise and vibration reduction techniques, including: forming a panel; and applying a first layer of a first stiffening material at an attachment point between the panel a vehicle structural frame.

One advantage of the present disclosure is that it provides significant weight reduction to glazing assemblies. In some tested glazing assemblies the weight difference between a glass glazing and a reinforced polymer glazing was 30-40%. This translates to noticeable fuel savings, especially for a relatively larger glazing. Moreover with the benefit of the present teachings no trade-off between higher noise and vibration ingress and heavier materials need be made. Vehicle noise, vibration and hardness (or NVH) targets are met with the designs made in accordance with the present teachings. Higher natural frequencies and lower deformation was measured on glazings designed according to the present teachings. The vehicle interior is quieter, having less noise penetration.

Additionally, with the present disclosure less complicated seals can be used with the glazing. Reinforcing stiffeners need not be incorporated into the seal. Thus, part costs and manufacturing investments are reduced.

The invention will be explained in greater detail below by way of example with reference to the figures, in which the same reference numbers are used in the figures for identical or essentially identical elements. The above features and advantages and other features and advantages of the present teachings are readily apparent from the following detailed description of the best modes for carrying out the invention when taken in connection with the accompanying drawings. In the figures:

BRIEF DESCRIPTION OF THE DRAWINGS

FIG. 1 is a rear perspective view of a vehicle with glazing assembly according to an exemplary embodiment of the present disclosure.

FIG. 2 is a front view the vehicle glazing assembly of FIG. 1 with bucking load arrows shown at attachment points.

FIG. 3 is a cross-sectional view of the vehicle glazing assembly of FIG. 2 taken at line 3-3.

FIG. 4 is a cross-sectional view of the vehicle glazing assembly of FIG. 2 taken at line 4-4.

FIG. 5 is a rear view of the vehicle glazing assembly of FIG. 1.

FIG. 6 is a cross-sectional view of another exemplary vehicle glazing assembly.

FIG. 7 is a cross-sectional view of the vehicle glazing assembly of FIG. 6.

FIG. 8 is a rear view of the vehicle glazing assembly of FIG. 6.

DETAILED DESCRIPTION

Figure 9:
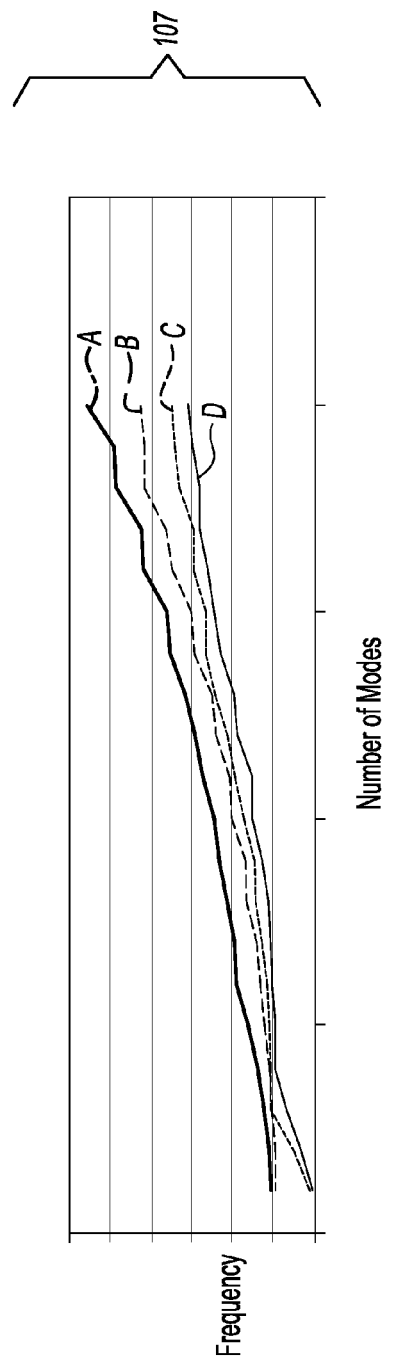
FIG. 9 is a comparative graph of the natural frequencies of existing glazing assemblies and glazing assemblies designed according to the teachings of the present disclosure.

Referring to the drawings, wherein like characters represent examples of the same or corresponding parts throughout the several views, there are shown exemplary vehicle glazing assemblies. Vehicle glazing assemblies provide improved NVH performance with the use of lighter weight glazings or panels. In the illustrated embodiments, panels are at least partially composed of polycarbonate or acrylic—significantly lighter materials than glass. These materials can also have a higher damping loss factor than tempered glass. Glazing assemblies include multiple coats of a stiffener applied at attachment points for the panels. Applications of the stiffener at the attachment points of the panel provide efficient reinforcement for the assemblies. The present teachings are applicable to any type of glazing, including but not limited to backlights, windshields, center high-mounted stop lamps (or "CHMSLs"), and sidelights. Additionally, glazing assemblies can be attached to any type of vehicle structure including, for example, frames for a truck, coupe, sedan, convertible, SUV or all-utility vehicle.

Referring now to FIG. 1, there is shown therein a vehicle 10 having an exemplary glazing assembly 20 incorporated therein. The vehicle 10 is a pick-up truck. An upper passenger portion of the vehicle is shown. In this section of the vehicle several glazing assemblies are included. As shown, the vehicle includes a backlite assembly 20 behind rear passenger seating 30. Backlite assembly 20 is attached to a roof frame 40 at attachment points denoted by an "X." Frame 40 encircles backlite assembly 20 and can be attached to backlite assembly at any point around the perimeter of backlite assembly.

Also shown in FIG. 1, is a CHMSL 50 in the roof frame 40. CHMSL 50 is mounted atop the backlite assembly 20. As shown, a side window 60 is included in the cabin section of the vehicle. The present teachings will have application to these glazing assemblies as well.

Now referring to FIGS. 2-5, there is shown the backlite assembly 20 of FIG. 1 isolated from the vehicle. FIG. 2 shows a front view of the backlite assembly. Backlite assembly 20 includes a panel 70 that serves as a rear window for the vehicle passenger compartment. Panel 70 is composed of a lighter weight material, e.g., polycarbonate, acrylic or chemically strengthened thin glass (or "CSTG") with or without an acoustic lamination.

FIG. 2 is also a free-body diagram of the backlite assembly 20 when attached to the vehicle frame (40 as shown in FIG. 1). In this embodiment, there are four attachment points between the backlite assembly 20 and vehicle frame 40. As shown in FIG. 2, each attachment point sees loading toward a center section 80 of the backlite assembly 20. For a lightweight backlite assembly having a thickness of approximately 3.8 mm, each attachment point sees a load of approximately 1 kN in the directions shown. Fewer or more attachment points can be made between the vehicle frame and the backlite assembly than the four shown in the embodiment of FIG. 2.

FIG. 3 shows, the backlite assembly 20 of FIG. 2 at cross-section 3-3. Backlite assembly 20 includes the panel 70 which is transparent in this embodiment. Applied to the panel 70 is a layer 90 of stiffening material. In this embodiment, stiffening material 90 is composed of polycarbonate. In other embodiments, layer 90 can be at least partially composed of any number of lighter weight materials, including for example, acrylic, CSTG and CSTG with an acoustic lamination. Layer 90 extends from the top of the panel to the bottom of the panel 70, as shown.

Backlite assembly 20 further includes another layer 100 of stiffening material. Layer 100 is applied at the perimeter of panel 70. In the cross-section, shown in FIG. 3, layer 100 is at the top and bottom portions of the panel 70. In the cross-section shown in FIG. 4, layer 100 is at the driver and passenger sides of panel 70. Layer 100 extends the entire width of panel 70. Layer 100 is also composed of a lighter weight material, e.g., polycarbonate. In other embodiments layer 90 and layer 100 have different material compositions. As shown, the thickness of the stiffening material is greater at the perimeter of the panel than a center section 80 of the panel. As shown in FIG. 5, which is a rear view of the backlite assembly of FIG. 2, layer 100 is uniformly applied to the perimeter of panel. A stiffening rib is formed by application of layer 100 to the perimeter of the panel 70. In this embodiment layer 90 and layer 100 have approximately the same thickness. Layer 90 and Layer 100 can be measured as one layer at the perimeter of panel. The combined layer at the perimeter of the panel is approximately twice as thick as the thickness of layer 90. Combined layer provides the backlite assembly 20 with stiffer edges.

Now referring to FIGS. 6-8, there is shown another exemplary embodiment of a glazing assembly 25. Glazing assembly 25 is a backlite assembly. Glazing assembly 25 includes a panel 75 that serves as a rear window for a vehicle passenger compartment. Panel 75 is composed of a lighter weight material, e.g., polycarbonate, acrylic or a CSTG. Panel 75 is transparent in this embodiment as well. Applied to a perimeter of panel 75 is a layer 105 of stiffening material. In this embodiment, stiffening material 105 is composed of the same material as panel 75, e.g., polycarbonate, acrylic or a CSTG. As shown, the thickness of the stiffening material is greater at the perimeter of the panel than a center section 85 of the panel. As shown in FIG. 8, which is a rear view of the backlite assembly 25, layer 105 is uniformly applied to the perimeter of panel 75. A stiffening rib is formed by application of layer 105 to the perimeter of the panel 75.

Turning now to FIG. 9, there is shown a data plot 107 for several different backlite designs analyzed with Computer Engineering Analysis (or "CAE") tools under different modes. The data plot comparatively shows the natural frequency for each design at different modes. Approximately 20 different modes were calculated. Line A demonstrates the calculated frequencies (e.g., in Hz) for a backlite assembly according to an exemplary embodiment of the present teachings, the backlite assembly having six degrees of freedom. Of the lot, Design A produces the highest natural frequencies and better NVH performance. Design B is represented by Line B. Design B is a backlite assembly configured according to another design. Design B also has six degrees of freedom. At practically every mode, Design B resonates at a lower natural frequency than Design A. The greatest distinction shown between Lines A and B is a difference of approximately 1.2 Hz, with Line A having a natural frequency of 7.5 Hz at mode number 20. The same phenomenon takes place when the designs have fewer degrees of freedom. Design C, as indicated by Line C, is a design according to an exemplary embodiment of the present disclosure. Design C has three degrees of freedom. Design D, as indicated by Line D, represents a backlite assembly according to the prior art. Design D has three degrees of freedom. Design D has a lower frequency at every mode as compared to Design C. The greatest distinction shown between Lines C and D is a difference of approximately 0.4 Hz, with Line C having a natural frequency of 5.5 Hz at mode number 20. Comparable disparities are noticed at mode number 11 as well.

FIGS. 10 through 15 are finite element deformation grids for the vehicle glazing assembly (or backlite assembly) of FIGS. 6-8 subject to various loading conditions. Deformation contours are generated by computer-aided modeling tools. Contours are superimposed on backlite assemblies. Each contour represents a level of deformation seen by the backlite assembly in an area of the backlite assembly when undergoing loading. Nine possible levels of deformation were captured for different loading scenarios—D1, D2, D3, D4, D5, D6, D7, D8, and D9 with D9 being the highest level of deformation. In FIGS. 7-12, D1 is equal to deformation between approximately 0.000E+00 mm and 3.333E−01 mm; D2 is equal to deformation between approximately 3.333E−01 mm and 6.667E−01 mm; D3 is equal to deformation between approximately 6.667E−01 mm and 1.000E+00 mm; D4 is equal to deformation between approximately 1.000E+00 mm and 1.333E+00 mm; D5 is equal to deformation between approximately 1.333E+00 mm and 1.667E+00 mm; D6 is equal to deformation between approximately 1.667E+00 mm and 2.000E+00 mm; D7 is equal to deformation between approximately 2.000E+00 mm and 2.333E+00 mm; D8 is equal to deformation between approximately 2.333E+

00 mm and 2.667E+00 mm; and D9 is equal to deformation between approximately 2.667E+00 mm and 3.000E+00 mm, as shown in Table 1 below.

TABLE 1

Contour Deformation Correlations

| Designation | Deformation Range |
|---|---|
| D1 | 0.000E+00 mm–3.333E−01 mm |
| D2 | 3.333E−01 mm–6.667E−01 mm |
| D3 | 6.667E−01 mm–1.000E+00 mm |
| D4 | 1.000E+00 mm–1.333E+00 mm |
| D5 | 1.333E+00 mm–1.667E+00 mm |
| D6 | 1.667E+00 mm–2.000E+00 mm |
| D7 | 2.000E+00 mm–2.333E+00 mm |
| D8 | 2.333E+00 mm–2.667E+00 mm |
| D9 | 2.667E+00 mm–3.000E+00 mm |

FIGS. 10-15 further demonstrate how the present backlite assemblies with stiffened edges reduce the amount of deformation seen by the backlite assembly. Particularly, several findings were discovered from the computer-aided finite element analysis: (1) lightweight glazing panels with stiffened edges increase the panel natural frequencies; (2) stiffening the lightweight panel edges will mitigate potential panel attachment region issues by increasing the edge buckling stiffness and reducing the buckling deformation significantly; and (3) the overall panel deformation and acceleration magnitudes are significantly reduced by panel edge stiffening, thus resulting in less noise penetration into the vehicle interior.

Figure 10:
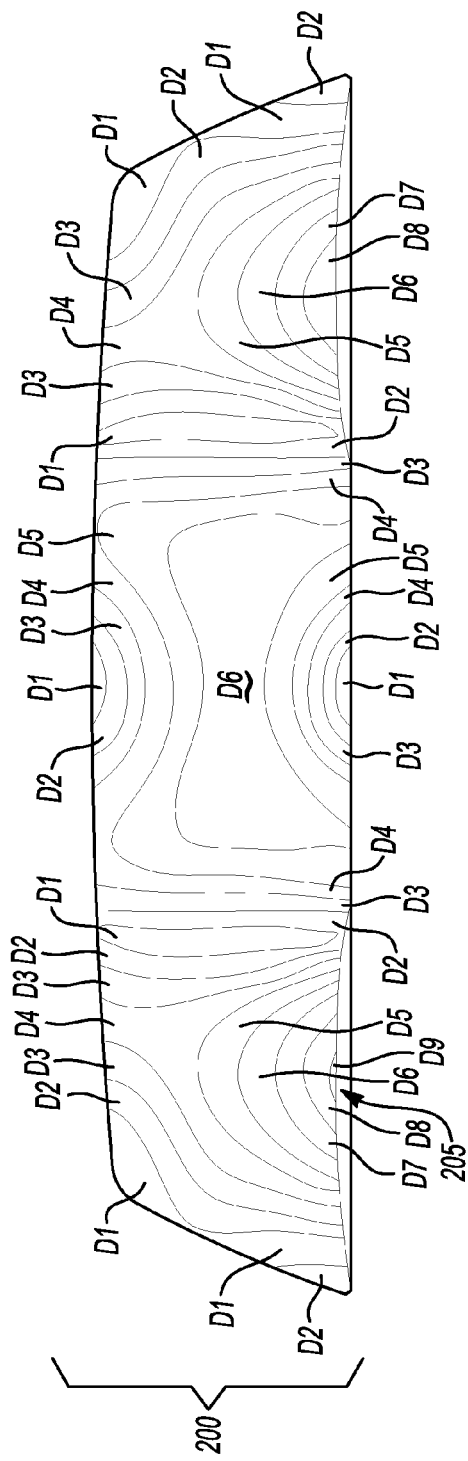
FIGS. 10 through 15 are finite element deformation grids comparing an exemplary glazing assembly and another design under various loading conditions.
Figure 11:
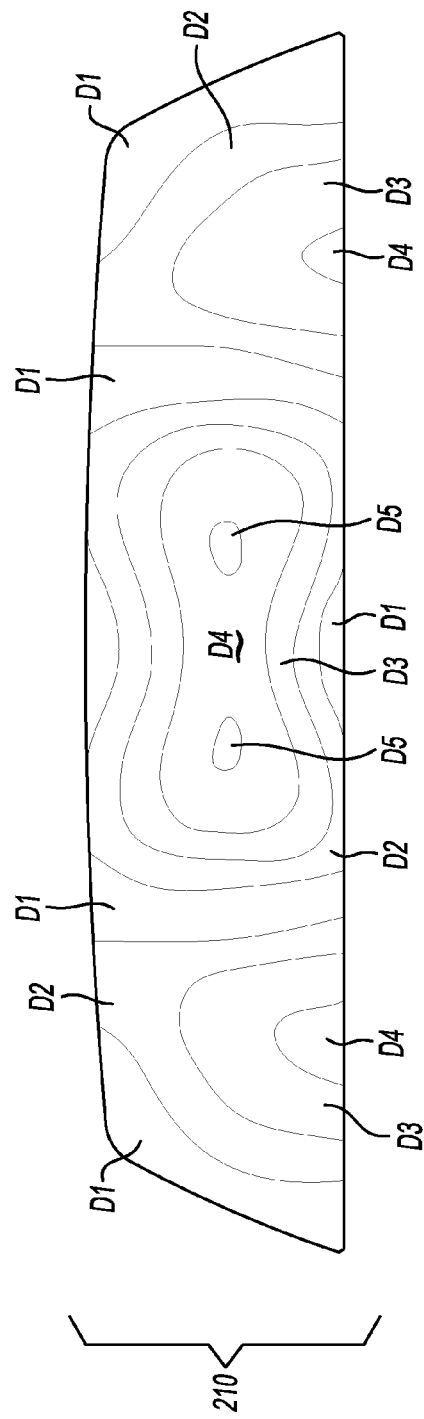

FIGS. 10 and 11 are comparative renderings of deformation contours on two different backlite assemblies. Each backlite assembly is subject to an in-plane mis-attachment loading scenario. FIG. 11 shows a backlite assembly 210 designed according to the present teachings. FIG. 10 shows a backlite assembly 200 having a different design. As shown in FIG. 10, backlite assembly 200 sees all nine levels of deformation D1, D2, D3, D4, D5, D6, D7, D8 and D9. Higher buckling can occur at point 205 with this design. With the backlite assembly of FIG. 11, only deformation in levels D1, D2, D3, D4 and D5 are experienced by the backlite assembly 210.

Figure 12:
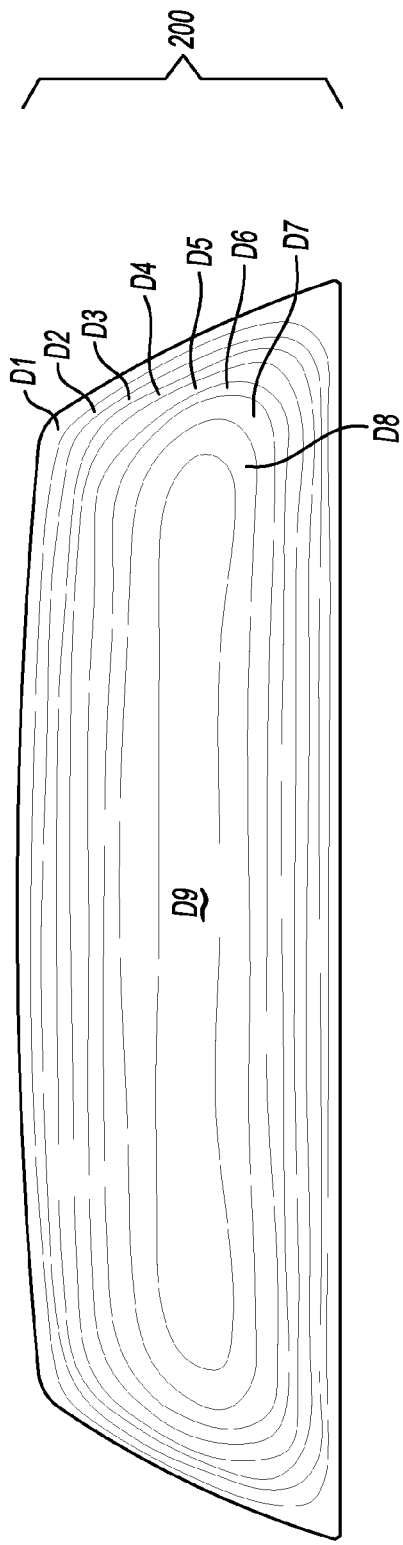
Figure 13:
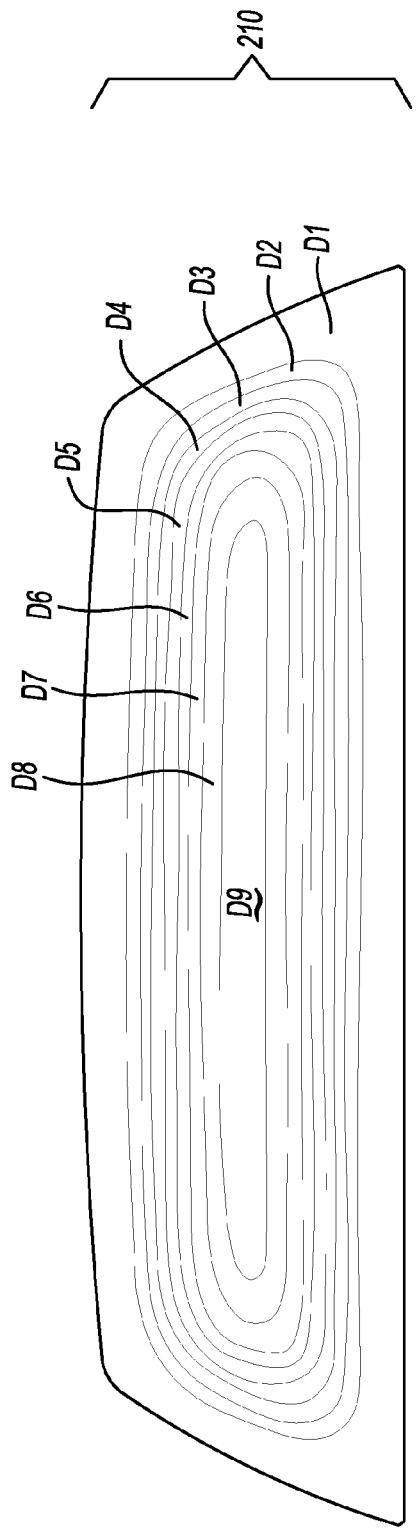

FIGS. 12 and 13 are comparative renderings of deformation contours for the two backlite assemblies 200, 210. Each backlite assembly 200, 210 are subject to an evenly distributed applied pressure loading scenario. FIG. 13 shows a backlite assembly 210 designed according to the present teachings. FIG. 12 shows a backlite assembly 200 having a different design. As shown in FIG. 12, each backlite assembly 200, 210 sees all nine levels of deformation with the highest level of deformation being in a center section of the backlite assembly. With the backlite assembly 210 of FIG. 13, however, a much smaller area of the backlite assembly sees D9 level (or the highest level) of deformation.

Figure 14:
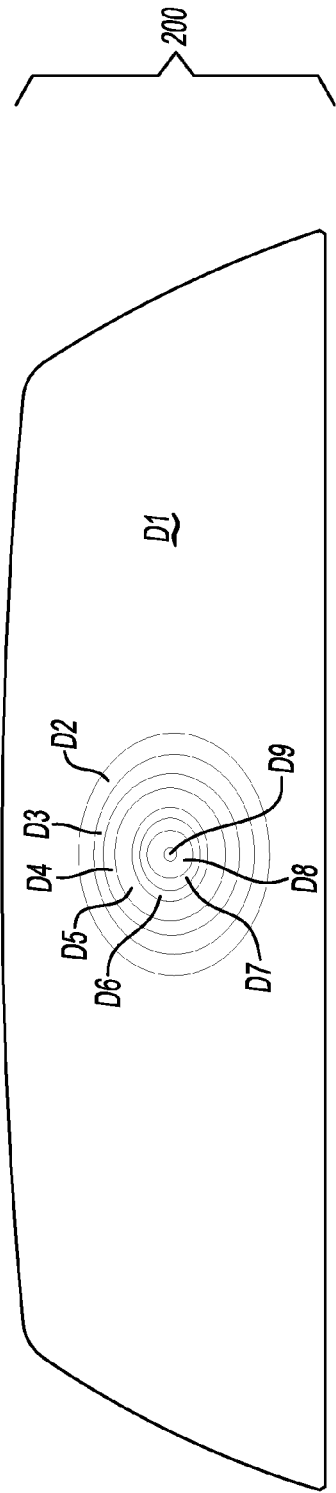
Figure 15:
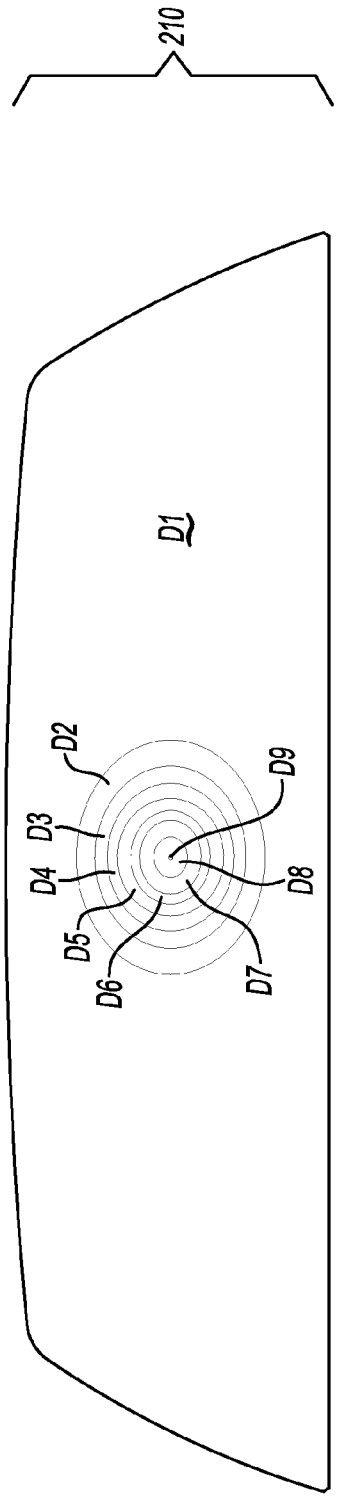

Turning now to FIGS. 14 and 15, there is also shown comparative renderings of deformation contours for the two different backlite assemblies 200, 210. Each backlite assembly is subject to an applied point load scenario. FIG. 15 shows a backlite assembly 210 designed according to the present teachings. FIG. 14 shows a backlite assembly 200 having a different design. As shown each backlight assembly sees all nine levels of deformation with the highest level of deformation (D9) being in a center section of the backlite assembly. With the backlite assembly 210 of FIG. 15, however, a smaller area of the backlite assembly sees the highest level of deformation. D9 spans a slightly larger surface area in the design of FIG. 14.

Figure 16:
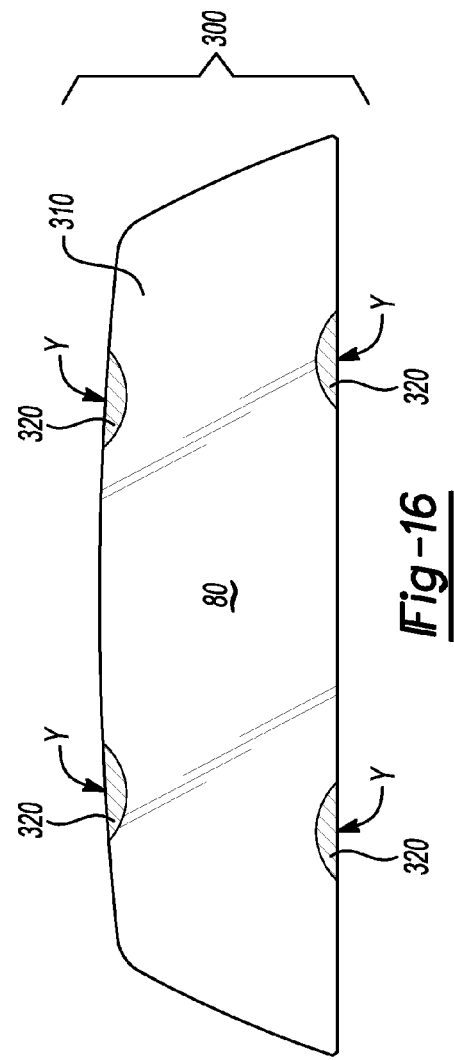
FIG. 16 is a rear view of a vehicle glazing assembly according to another exemplary embodiment of the present disclosure.

With reference to FIG. 16 there is shown therein another exemplary embodiment of a vehicle glazing assembly 300. FIG. 16 shows a rear view of a backlite assembly 300. Backlite assembly includes a panel 310 that serves as a rear window for a vehicle passenger compartment. In this embodiment, there are four attachment points, "Y," between the backlite assembly 300 and the vehicle frame. Applied to the panel is a layer of stiffening material 320 at the attachment points, Y, of the backlite assembly 300. The stiffening material 320 need not be applied over the entire perimeter of the panel 310, as shown. In this embodiment, the application area for the stiffening material 320 is arcuate.

Also included with the present disclosure is a method of manufacturing a vehicle glazing assembly with noise and vibration reduction techniques, comprising: forming a vehicle panel; and applying a first layer of a first stiffening material at an attachment point between the panel a vehicle structural frame (exemplary glazing assemblies 20, 25 and 300 are shown in FIGS. 2 through 8 and 16, respectively). The first layer of stiffening material can be applied to an entire perimeter of the panel, e.g., as shown in the embodiments of FIGS. 2-8. In one embodiment, the method also includes applying a second layer of a second stiffening material to the panel, e.g., as discussed with respect to FIGS. 2-5. Panel can be formed by any number of processes including injection molding or stamping.

In one embodiment the method includes curing the first and second stiffening materials. Heat and/or pressurized curing can be used according to material selections. Applying the second layer of stiffening material at the attachment point can include applying the second layer so that a thickness of the second layer is of equal or greater thickness than the first layer of stiffening material. Thus a ratio of stiffening material is at least 2:1, edges to center section. An example of this is shown and discussed with respect to the backlite assembly of FIGS. 2-5. Other ratios between the first layer and second layer of stiffening material can also be applied to the panel. Furthermore, in other embodiments more than two layers of stiffening material are applied to the panel. In one version of the method the step of applying either one of the first layer or second layer of stiffening materials is done via a spray application. A laser sprayer or pneumatic sprayer can be used. In other embodiments the stiffening material(s) can be added to a mold for the panel. Any molding process including injection molding or die casting can be used.

Those familiar with the art to which this invention relates will recognize various alternative designs and embodiments for practicing the invention within the scope of the appended claims.

We claim:

1. A rear window for covering an opening in a vehicle comprising:
   a single-piece panel that spans the opening, the panel having a perimeter edge, the panel having an outer surface and an opposing inner surface, the panel having a stiffening rib provided as part of the single-piece panel on the perimeter edge of the panel, wherein the stiffening rib extends from the perimeter edge to a limited extent to a central portion of the window, and wherein the stiffening rib extends from the inner surface of the panel away from the outer surface and about the entire perimeter of the panel;
   wherein the central portion of the window within the stiffening rib consists of the panel, and wherein the single-piece panel and the stiffening rib are formed out of the same material, and wherein the stiffening rib increases the natural resonant frequency of the window.

2. The window of claim 1 wherein the panel has a thickness and combined thickness of the stiffening rib provided on the panel and the panel is at least twice the thickness of the panel.

3. The window of claim 1 wherein the stiffening rib is formed of a material selected from the group consisting of:
   polycarbonate; and
   acrylic.

4. The window of claim 3 wherein the panel is formed of a material selected from the group consisting of:
   polycarbonate; and
   acrylic.

5. The window of claim 1 wherein the stiffening rib increases edge buckling stiffness and reduces edge buckling deformation.

6. The window of claim 1 wherein the stiffening rib reduces deformation of the window by edge buckling, evenly distributed pressure loading, and point loading.

7. A window for covering an opening in a vehicle comprising:
   an outer panel of a transparent material that spans the opening, the outer panel having a perimeter edge;
   an inner panel contacting the outer panel in a face-to-face relationship, the inner panel having an outer surface facing and contacting the outer panel of the glass and an opposing inner surface, the inner panel further having a perimeter edge aligned with the perimeter edge of the outer panel;
   a stiffening rib provided on the perimeter edge of the inner panel, wherein the stiffening rib extends from the perimeter edge to a limited extent and towards a central portion of the window, and wherein the stiffening rib extends about the entire perimeter of the inner panel, from the inner surface of the inner panel away from the outer panel of the transparent material; and
   wherein a central portion of the window within the stiffening rib includes only the inner panel and the outer panel.

8. The window of claim 7 wherein the combined thickness of the stiffening rib provided on the inner panel and the outer panel is at least three times the thickness of the outer panel.

9. The window of claim 7 wherein the stiffening rib is formed of a material selected from the group consisting of:
   polycarbonate; and
   acrylic.

10. The window of claim 9 wherein the inner panel is formed of a material selected from the group consisting of:
    polycarbonate; and
    acrylic.

11. The window of claim 9 wherein the outer panel is formed of a material selected from the group consisting of:
    polycarbonate;
    acrylic; and
    chemically strengthened thin glass.

12. The window of claim 7, wherein the inner panel and the outer panel are of different material.

\* \* \* \* \*